United States Patent
Sharma et al.

(10) Patent No.: US 11,405,853 B2
(45) Date of Patent: Aug. 2, 2022

(54) SERVER, COMMUNICATION SYSTEM, AND PERFORMANCE MEASUREMENT METHOD

(71) Applicant: Groundhog Inc., Taipei (TW)

(72) Inventors: Amit Kumar Sharma, Taipei (TW); I-Hung Lin, Taipei (TW)

(73) Assignee: Groundhog Inc., Taipei (TW)

( * ) Notice: Subject to any disclaimer, the term of this patent is extended or adjusted under 35 U.S.C. 154(b) by 0 days.

(21) Appl. No.: 16/520,301

(22) Filed: Jul. 23, 2019

(65) Prior Publication Data

US 2020/0169944 A1     May 28, 2020

Related U.S. Application Data

(60) Provisional application No. 62/770,757, filed on Nov. 22, 2018.

(51) Int. Cl.
| | |
|---|---|
| *H04W 48/06* | (2009.01) |
| *H04W 24/08* | (2009.01) |
| *H04W 24/10* | (2009.01) |
| *H04W 64/00* | (2009.01) |
| *H04W 72/04* | (2009.01) |

(52) U.S. Cl.
CPC ........... *H04W 48/06* (2013.01); *H04W 24/08* (2013.01); *H04W 24/10* (2013.01); *H04W 64/00* (2013.01); *H04W 72/0453* (2013.01)

(58) Field of Classification Search
CPC ..... H04W 48/06; H04W 24/08; H04W 24/10; H04W 64/00; H04W 72/0453
See application file for complete search history.

(56) References Cited

U.S. PATENT DOCUMENTS

| 9,445,421 B2 * | 9/2016 | Levine ................. H04W 72/06 |
| 2011/0021190 A1 * | 1/2011 | Gunaratnam ......... H04W 28/12 455/433 |

(Continued)

FOREIGN PATENT DOCUMENTS

| WO | 2015197537 | 12/2015 | |
| WO | WO-2015197537 A1 * | 12/2015 | ............ H04W 24/10 |
| WO | 2018189282 | 10/2018 | |

OTHER PUBLICATIONS

"Search Report of Europe Counterpart Application", dated Feb. 4, 2020, p. 1-p. 13.

*Primary Examiner* — Derrick W Ferris
*Assistant Examiner* — Sumitra Ganguly
(74) *Attorney, Agent, or Firm* — JCIPRNET

(57) ABSTRACT

A server, a communication system, and a performance measurement method are provided. In the method, frequency spectrum information is determined. The frequency spectrum information includes multiple frequency spectrums supported by at least two mobile networks. A network configuration is generated according to the frequency spectrum information. The core network entity instructs a radio access network node (i.e., base station) to transmit a control message to a user equipment (UE) according to the network configuration. The frequency spectrums are scanned for a network performance measurement of the UE, and the UE is allowed to register to at least one its own subscribed mobile network of the at least two mobile networks but not allowed to register to the others of the at least two mobile networks. Accordingly, an easier way to motoring competitors' network performance is provided.

9 Claims, 3 Drawing Sheets

(56) References Cited

U.S. PATENT DOCUMENTS

| | | | | |
|---|---|---|---|---|
| 2012/0135729 A1* | 5/2012 | Chiou | ............... | H04W 24/10 |
| | | | | 455/434 |
| 2014/0115131 A1* | 4/2014 | Zhu | ................ | H04L 41/0893 |
| | | | | 709/221 |
| 2015/0359027 A1* | 12/2015 | Mo | .............. | H04W 76/15 |
| | | | | 370/328 |
| 2016/0338107 A1* | 11/2016 | Zeng | ............... | H04W 74/006 |

\* cited by examiner

US 11,405,853 B2

SERVER, COMMUNICATION SYSTEM, AND PERFORMANCE MEASUREMENT METHOD

CROSS-REFERENCE TO RELATED APPLICATION

This application claims the priority benefit of U.S. provisional application Ser. No. 62/770,757, filed on Nov. 22, 2018. The entirety of the above-mentioned patent application is hereby incorporated by reference herein and made a part of this specification.

BACKGROUND OF THE DISCLOSURE

1. Field of the Disclosure

The present disclosure generally relates to mobile network, in particular, to a server, a communication system, and a performance measurement method.

2. Description of Related Art

Nowadays, almost everyone has an Internet connectable device (such as mobile phone, tablet, laptop, etc.), and the device may connect to Internet through mobile networks. There are many mobile network operators (MNOs) in each country. MNO would always like to monitor its competitors' network performance (coverage in terms of signal strength and signal quality). Currently, operators collect competitors' network performance information by conducting drive tests, which requires subscriber identity module (SIM) cards or subscriptions from the target competitors to be monitored. However, this method is hard to scale up both temporally and spatially.

SUMMARY OF THE DISCLOSURE

Accordingly, the present disclosure is directed to a server, a communication system, and a performance measurement method, which provide an easier way to monitor competitors' network performance through configure a network configuration in operator's operation support system (OSS).

A server in an embodiment of the present disclosure includes a communication transceiver and a processor. The communication transceiver is used to transmit and receive signals. The processor is coupled to the communication transceiver and configured to perform the following steps. Frequency spectrum information is determined. The frequency spectrum information includes multiple frequency spectrums possessed by at least two mobile networks. A network configuration is generated according to the frequency spectrum information. The network configuration is used by a cellular core network entity. The frequency spectrums are scanned for a network performance measurement of a user equipment (UE), and the UE is allowed to register to at least one its own subscribed mobile network of the at least two mobile networks. Then, the network configuration is transmitted through the communication transceiver.

A communication system in an embodiment of the present disclosure includes a server, a cellular core network entity, and a user equipment (UE). The server determines frequency spectrum information, and generates a network configuration according to the frequency spectrum information. The frequency spectrum information includes multiple frequency spectrums possessed by at least two mobile networks. The cellular core network entity is configured with the network configuration to indicate the UE to configure with the frequency spectrum information. The UE performs a network performance measurement by scanning the frequency spectrums based on the frequency spectrum information. The UE is allowed to register to at least one its own subscribed mobile network of the at least two mobile networks.

A performance measurement method in an embodiment of the present disclosure includes the following steps. Frequency spectrum information is determined. The frequency spectrum information includes multiple frequency spectrums possessed by at least two mobile networks. A network configuration is generated according to the frequency spectrum information. The network configuration is used by a cellular core network entity. The frequency spectrums are scanned for a network performance measurement of a user equipment (UE), and the UE is allowed to register to at least one its own subscribed mobile network of the at least two mobile networks.

Based on the above, in the server, the communication system, and the performance measurement method of the embodiments of the disclosure, a network configuration would be determined based on multiple frequency spectrums supported by two or more mobile networks. The network configuration would set in a cellular core network entity, and then UEs within the service coverage of a base station would receive an indication of frequency spectrum via the base station. Even though a UE may merely register to one authenticated mobile network of the operator, the UE may scan the frequency spectrum of unauthenticated mobile networks to measure the network performance (such as signal strength, quality, etc.). Then, a monitoring result of the network performance with at least two mobile networks would be obtained. Accordingly, comparing with the performance measurement with network deployment and status of competitors, the embodiments of the disclosure provides an easier way to motoring competitors' network performance.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
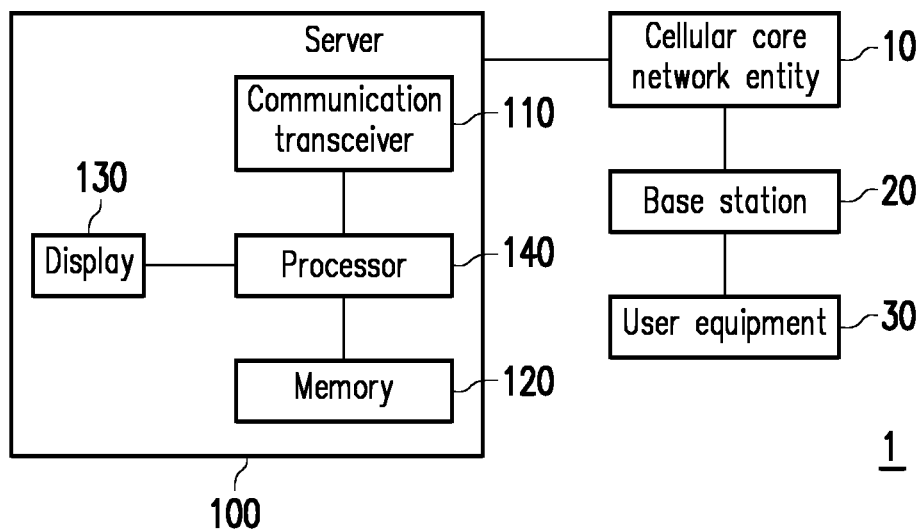
FIG. 1 is a schematic diagram of a communication system according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a schematic diagram of a communication system 1 according to an embodiment of the disclosure. Referring to FIG. 1, the communication system 1 includes, but not limited to, a cellular core network entity 10, a base station (BS) 20, a user equipment (UE) 30, and a server 100. It should be noticed that, the numbers of the cellular core network entity 10, the BS 20, and the UE 30 may be more than one based on actual situation.

The cellular core network entity 10, the BS 20, and the UE 30 are in one mobile network of one mobile network operator (MNO). The mobile network may be global system for mobile communications (GSM)/general packet radio service (GPRS)/enhanced data rates for GSM evolution (EDGE) (i.e., second generation (2G) mobile network), code division multiple access (CDMA) 2000/evolution-data optimized (EVDO), universal mobile telecommunications system (UMTS)/high speed packet access (HSPA) (i.e., 3G mobile network), long term evolution (LTE), (long term evolution-advanced) LTE-A (i.e., 4G mobile network), 5G New Radio or further generation mobile networks.

For different generations of the mobile network, the cellular core network entity 10 and the BS 20 could be different. For example, regarding 3G and 4G networks, the cellular core network entity 10 could be a home subscribe server (HSS), or a mobility management entity (MME), and the BS 20 could be a home evolved node B (HeNB), eNB, an advanced base station (ABS), or a base transceiver system (BTS). Regarding for 5G network, the cellular core network entity 10 could be an authentication server function (AUSF), or an access and mobility management function (AMF), and the BS 20 could be gNodeB (gNB). Alternatively, the cellular core network entity 10 could be any sever in the core network. In the embodiment of the disclosure, the cellular core network entity 10 may further operates an operation support system (OSS), a business support (BSS), or other operations, administration and maintenance (OAM) related platforms of the mobile network.

The UE 30 may have multiple implementations, for example, (but is not limited to) a mobile station, an advanced mobile station (AMS), a telephone device, a customer premise equipment (CPE), a wireless sensor, etc. In the embodiment of the disclosure, the UE 30 may be equipped with one or more physical subscriber smart cards (such as a subscriber identity module (SIM), a removable user identity module (RUIM), a universal integrated circuit card (UICC), etc.) or embedded SIM (eSIM), which is/are allowed to register to it own subscribed mobile network(s) but not allowed to register to the other mobile networks (i.e., non-subscribed mobile networks) except for roaming.

The server 100 includes, but not limited to, a communication transceiver 110, a memory 120, a display 130, and a processor 140.

The communication transceiver 110 could be a communication interface (such as universal serial bus (USB), universal asynchronous receiver/transmitter (UART), RJ45, etc.) or a wireless transceiver (such as UMTS, LTE, 5G New Radio, Wi-Fi, Bluetooth, etc.). The communication transceiver 110 is used to transmit/receive signals to/from the cellular core network entity 10.

The memory 120 could be any type of a fixed or movable random access memory (RAM), a read-only memory (ROM), a flash memory or a similar device or a combination of the above devices. The memory 120 records program codes, network configurations, frequency spectrum information, codebooks, buffer data or permanent data.

The display 130 could be liquid-crystal display (LCD), light-emitting diode (LED), organic light-emitting diode (OLED) or other display.

The processor 140 is coupled to the communication transceiver 110, the memory 120 and the display 130. The processor 140 is configured to process digital signals, executes a procedure of the exemplary embodiment of the disclosure, and is adapted to access or load the data and software modules recorded by the memory 120. Functions of the processor 140 may be implemented by using a programmable unit such as a central processing unit (CPU), a microprocessor, a microcontroller, a digital signal processing (DSP) chip, a field programmable gate array (FPGA), etc. The functions of the processor 140 may also be implemented by an independent electronic device or an integrated circuit (IC), and operations of the processor 140 may also be implemented by software.

In the embodiment of the disclosure, the processor 140 may handle operations, administration, and maintenance (OAM) functions for the mobile network, such as 3G, 4G, 5G, or further generation. For example, the processor 140 can handle signaling and message of billing and operational support systems (BOSS)/operation support system (OSS) for 3G core network. The processor 140 may further establish communications through the communication transceiver 110 with the cellular core network entity 10 to transmit or receive data or message with each other.

In order to fully convey the spirit of the disclosure to those skilled in the art, several embodiments are provided below for further descriptions. In the following content, the method of the embodiment of the disclosure is described with reference of various devices in the communication system 1. Various steps of the method of the embodiment of the disclosure may be adjusted according to an actual implementation, and are not limited by the disclosure.

Figure 2:
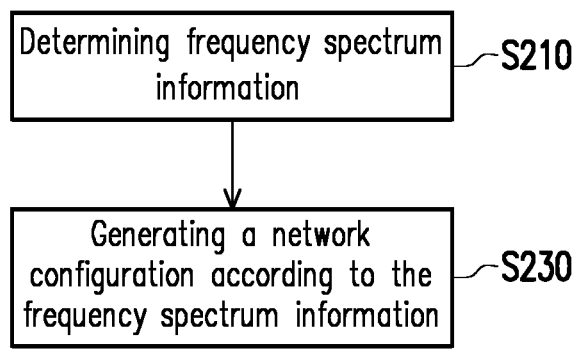
FIG. 2 is a flowchart illustrating a performance measurement method according to an embodiment of the disclosure.

FIG. 2 is a flowchart illustrating a performance measurement method according to an embodiment of the disclosure. Referring to FIG. 2, the processor 140 determines frequency spectrum information (step S210). Specifically, the embodiment of the disclosure proposes a method to offer a solution for mobile operators and users to monitor its competitors' network performance by a specific configuration in operator's OSS system, so that required competitor information data can be collected and further analyzed for comparison.

To monitor the network performance of nearby mobile networks, such as competitors' and domestic roaming partners' networks in large spatial and temporal scale, by utilizing UE capabilities in line with 3rd generation partnership project (3GPP) standard. One capability of the embodiment is the full spectrum scan capability of the UE 30. The UE 30 is designed to scan a frequency spectrum including multiple carrier frequencies depending on its capability of chipset. Although only the subscriber smart card or eSIM provided and activated by operator will allow the UE 30 to pass authorization process and register to its own mobile network (which corresponds to one frequency spectrum), the UE 30 may keep measuring the neighboring cells in specific carrier frequencies (which corresponds to other frequency spectrums) configured by OSS of the cellular core network entity 10.

Figure 3:
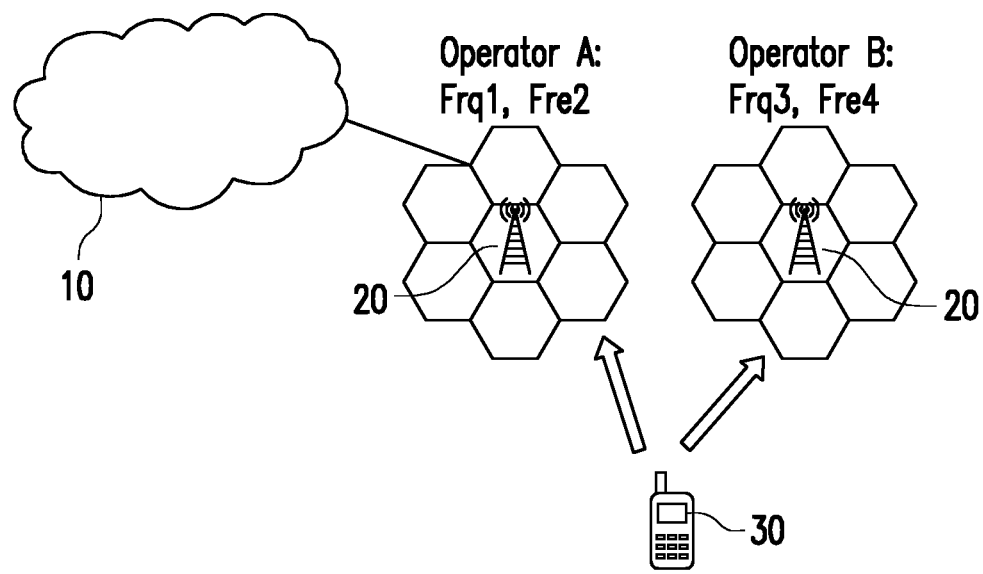
FIG. 3 is a schematic diagram illustrating frequency spectrum scanning according to an embodiment of the disclosure.

For example, FIG. 3 is a schematic diagram illustrating frequency spectrum scanning according to an embodiment of the disclosure. Referring to FIG. 3, the operator A uses carrier frequencies Freq1 and Freq2 while operator B uses carrier frequencies Freq3 and Freq4. However, operator A can mandates the UE 30 of its subscriber to measure all carrier frequencies Freq1, Freq2, Freq3, and Freq4 by proper OSS configuration. In this way, the frequency bands Freq3 and Freq4 which belong to the operator B can be monitored and used for later analysis.

In the embodiment of the disclosure, the frequency spectrum information includes multiple frequency spectrums possessed by two or more mobile networks. The mobile networks includes one mobile network of the communication system 1 and at least one other mobile network different from the mobile network of the communication system 1. The frequency spectrums of two mobile networks would be different. The carrier frequencies in the frequency spectrums of two mobile networks are not be overlapped. For example, a first frequency spectrum of one mobile network includes carrier frequencies 2110~2125 MHz and 1830~1850 MHz, and a second frequency spectrum of another mobile network includes carrier frequencies 2150~2170 MHz and 1820~1830 MHz. The frequency spectrum information would record a list of carrier frequencies and allowed bandwidth for each frequency spectrum. For example, the frequency spectrum information includes 1710~1725 MHz of carrier frequencies with 15 MHz bandwidth of one mobile network and 1725~1735 MHz of carrier frequencies with 10 MHz bandwidth of another mobile network.

In one embodiment, the processor 140 may select at least one of multiple licensed frequency bands in a region as the frequency spectrums. The region could be a country or any administrative district. For example, licensed frequency bands could be B1, B3, B7, and B8 for country A, and licensed frequency bands could be B3, B7, and B28 for country B. One or more carrier frequencies in the selected licensed frequency band would be in the frequency spectrums of the frequency spectrum information, so as to achieve partial spectrum scan.

In another embodiment, the processor 140 may select all licensed frequency bands in one region as the frequency spectrums. All carrier frequencies in the all licensed frequency bands would be in the frequency spectrums from the frequency spectrum information, so as to achieve full spectrum scan.

In still another embodiment, the processor 140 may obtain a capacity information of the UE 30 through the communication transceiver 110. The capacity information include one or more frequency bands supported by the UE. For example, the BS 20 can receives a radio resource control (RRC) message including a UE Capability Information from the UE 30 during registration process. The UE Capability Information conveys radio frequency (RF) parameters which includes one or more supported frequency bands. The server 100 may obtain the capacity information of the UE 30 via the BS 20 and the cellular core network entity 10. It should be noticed that, the capacity information may be included in other control message for other generation mobile networks, and the embodiment is not limited thereto. Then, the processor 140 select one or more of the frequency bands recorded in the capacity information of the UE 30 to be in the frequency spectrums.

Figure 4:
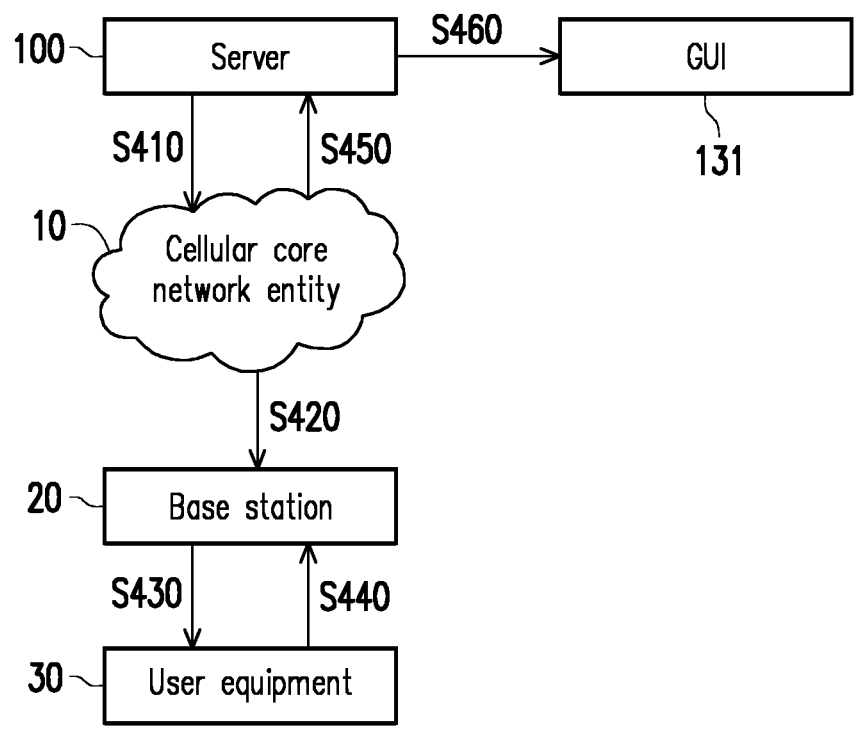
FIG. 4 is a flowchart illustrating a performance measurement method for the communication system according to an embodiment of the disclosure.

Then, the processor 140 generates a network configuration according to the frequency spectrum information (step S230). In the embodiment, the network configuration is used by the cellular core network entity 10, and the frequency spectrums are scanned for a network performance measurement of the UE 30. Specifically, the network configuration may be an OSS/BOSS configuration which can be configured in the cellular core network entity 10. FIG. 4 is a flowchart illustrating a performance measurement method for the communication system 1 according to an embodiment of the disclosure. Referring to FIG. 4, the processor 140 may configure OSS/BOSS operated on the cellular core network entity 10 by using batch scripts (step S410), so as to transmit the network configuration through the communication transceiver 110. The batch scripts record commands which can configure the OSS/BOSS according the network configuration. Taking Ericsson 4G base station as an example, the command could be: ADD EUTRANINTERN-FREQ: LocalCellId=1111, DlEarfcn=1325. Then, the OSS/BOSS operated on the cellular core network entity 10 would execute an instruction indicated in the network configuration towards BS 20 (step S420). The instruction, for example, is to request the BS 20 to transmit control message with the frequency spectrum information for the network performance measurement of the UE 30. The BS 20 may indicate the carrier frequency and its bandwidth of the frequency spectrums of multiple mobile networks recorded in the frequency spectrum information by transmitting a control message including the measured frequency spectrum information to the UE 30 (step S430). For example, the BS 20 transmit a RRC Reconfiguration message according to the frequency spectrum information to the UE 30, and the UE 30 may be configured to scan E-UTRA absolute radio frequency channel number (EARFCN) and bandwidth recorded in the RRC Reconfiguration message. The EARFCN would correspond to the carrier frequencies recorded in the frequency spectrum information. Then, the UE 30 would perform a network performance measurement by scanning the frequency spectrums based on the frequency spectrum information, and the frequency spectrum information may include frequency spectrum of competitor network.

The network performance measurement could be a measurement report process, which is used to measure signal strength, signal quality, signal to noise/interference ratio, etc. For example, reference signal received power (RSRP), reference signal received quality (RSRQ), and signal-to-interference-plus-noise ratio (SINR) with corresponding cell's physical cell identity (PCI) are reported in the measurement report for given reference signal with a specific carrier frequency. Besides the monitoring results (such as RSRP, RSRQ, etc.) directly from measurement report, the combination of the monitoring results may be converted into other results by using any form of formula. For example, the received signal strength indication (RSSI) can be derived by RSRP and RSRQ. In addition, the processor 140 may take the RSRP/RSRQ into a formula to generate new results for other network quality indicators. The UE 30 would scan all frequency spectrums listed in the frequency spectrum information to obtain corresponding monitoring result. It should be noticed that, the content of network performance measurement could be different for different generation mobile networks. In addition, the network performance measurement process can be either event-triggered or set periodically. For example, in case of event-triggered measurement, a threshold/offset would be configured properly in order to collect the required number of measurement reports.

The monitoring result of the network performance measurement would be reported to the BS 20 (step S440) and further transmitted to the server 100 (step S450). Then, the processor 140 may analyse the monitoring result of at least two mobile networks including operator itself and competitor(s). Then, a graphical user interface (GUI) 131 with the monitoring result can be presented on the display 130 (step 460).

Figure 5:
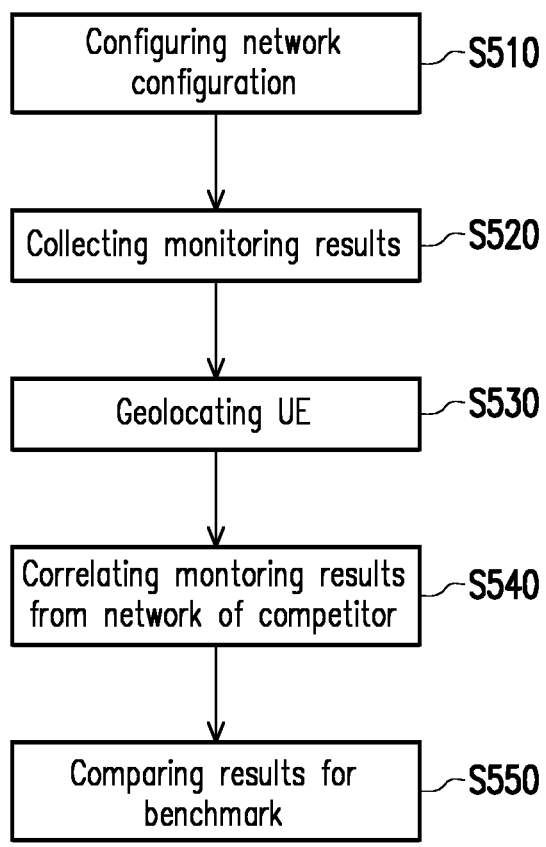
FIG. 5 is a flowchart illustrating a performance measurement method for the server according to an embodiment of the disclosure.

Regarding a view of the server 100, FIG. 5 is a flowchart illustrating a performance measurement method for the server 100 according to an embodiment of the disclosure. Referring to FIG. 5, the processor 140 may configure the network configuration as described in steps S210 to S230 (step S510). After UE 30 reports the monitoring results by scan the frequency spectrums based on the network configuration, the processor 140 may collect the monitoring results for each carrier frequency in the frequency spectrums (step S520).

To understand competitors' network performance, geographical information is another important aspect in addition to monitoring result. Geographical information can make the comparison more useful because measured performance in the same geographical area can be compared together. Therefore, how to associate collected competitor monitoring results with geographical information is another important part of this disclosure. There are several positioning algorithms including triangulation, tri-lateration, and TDOA (Time Difference Of Arrival), which can be applied to geo-locate the monitoring results (corresponding to the location of UE 30) collected in the OSS of cellular core network entity 10 (step S530). For example, the server 100 builds in the actual geographical information (such as latitude and longitude, direction, and tilt etc.) of three BSs 20 and three corresponding signal strengths of the UE 30 relative to the three BSs 20, and the server 100 may estimate the geographical information of the UE 30 by tri-lateration algorithm. Afterwards the processor 140 can use the location information of the UE 30 (such as mobile network code (MNC) or cell ID of serving BS 20, or a precise location estimated by positioning algorithms or feedback by UE 30 equipped with global positioning system (GPS) module) to correlate the monitoring results from competitor's network and analyze competitor network performance (step S540). By comparing the monitoring results (such as signal strength and signal quality) of two or more mobile networks at the same location, MNO can compare the network performance for benchmark purpose (step S550).

In summary, in the server, the communication system, and the performance measurement method of the embodiment of the disclosure, mobile operators can learn about other networks' RF performance, including signal strength, interference, etc. The proposed method changes the normal mobile phone behaviors to utilize its full spectrum scan capability to scan competitor networks' RF situation by adding carrier frequencies of competitor networks. The location information of measurement reports would be correlate with competitor's network monitoring results. Associated these collected competitor networks' RF performance data with the location where these data are collected by the means the implementers preferred and gathered the associated competitor network data and correspondent location information at the server, mobile operators can utilize these gathered competitor networks data and compare with their own network to learn about where they have better or worse performance as indication for their own network improvement tasks.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A server, comprising:
    a communication transceiver, transmitting and receiving signals; and
    a processor, coupled to the communication transceiver, and configured for:
        selecting at least one supported frequency band of a user equipment (UE) from capacity information of the UE to be in a plurality of frequency spectrums;
        determining frequency spectrum information, wherein the frequency spectrum information comprises the plurality of frequency spectrums possessed by at least two mobile networks;
        generating a network configuration according to the frequency spectrum information, wherein the network configuration is used by one of a cellular core network entity and an operation and maintenance (O&M) platform, the plurality of frequency spectrums are scanned for a network performance measurement of the UE, and the UE is allowed to register to at least one subscribed mobile network of the at least two mobile networks;
        generating a plurality of batch scripts, wherein each of the plurality of batch scripts records commands according to the network configuration;
        transmitting, through the communication transceiver, the plurality of batch scripts, wherein the plurality of batch scripts are used by the core network entity or the O&M platform,
    wherein the commands configure an operation support system (OSS) or a billing and operational support system (BOSS) operated on the core network entity according to the network configuration;
        receiving, through the communication transceiver, a monitoring result of the network performance measurement based on the frequency spectrum information;
        determining a location of the UE corresponding to the monitoring result; and
        comparing the monitoring result of the at least two mobile networks at the location.

2. The server according to claim 1, wherein the processor is configured for:
    selecting at least one of a plurality of licensed frequency bands in a region as the plurality of frequency spectrums.

3. The server according to claim 2, wherein the plurality of frequency spectrums comprise all of the plurality of licensed frequency bands.

4. A communication system, comprising:
    a server, selecting at least one supported frequency band of a user equipment (UE) from capacity information of the UE to be in a plurality of frequency spectrums, determining frequency spectrum information, generating a network configuration according to the frequency spectrum information, and generating a plurality of batch scripts, wherein the frequency spectrum information comprises the plurality of frequency spectrums supported by at least two mobile networks, each of the plurality of batch scripts records commands according to the network configuration;
    one of a cellular core network entity and an operation and maintenance (O&M) platform, configured with the plurality of batch scripts to indicate the UE to configure with the frequency spectrum information; and
    the UE, performing a network performance measurement by scanning the plurality of frequency spectrums based on the frequency spectrum information, wherein the UE is allowed to register to at least one subscribed mobile network of the at least two mobile networks,
    wherein the commands configure an operation support system (OSS) or a billing and operational support system (BOSS) operated on the core network entity according to the network configuration;

wherein the server receives a monitoring result of the network performance measurement based on the frequency spectrum information from the UE, determine a location of the UE corresponding to the monitoring result, and compares the monitoring result of the at least two mobile networks at the location.

5. The communication system according to claim 4, wherein the server selects at least one of a plurality of licensed frequency bands in a region as the plurality of frequency spectrums.

6. The communication system according to claim 5, wherein the plurality of frequency spectrums comprise all of the plurality of licensed frequency bands.

7. A performance measurement method, comprising:

selecting at least one supported frequency band of a user equipment (UE) from capacity information of the UE to be in a plurality of frequency spectrums;

determining frequency spectrum information, wherein the frequency spectrum information comprises the plurality of frequency spectrums supported by at least two mobile networks;

generating a network configuration according to the frequency spectrum information, wherein the network configuration is used by one of a cellular core network entity and an operation and maintenance (O&M) platform, the plurality of frequency spectrums are scanned for a network performance measurement of the UE, and the UE is allowed to register to at least one subscribed mobile network of the at least two mobile networks; and generating a plurality of batch scripts, wherein each of the plurality of batch scripts records commands according to the network configuration and is used by the core network entity or the O&M platform, wherein the commands configure an operation support system (OSS) or a billing and operational support system (BOSS) operated on the core network entity according to the network configuration, wherein after the step of generating the network configuration, further comprising:

receiving a monitoring result of the network performance measurement based on the frequency spectrum information;

determining a location of the UE corresponding to the monitoring result; and comparing the monitoring result of the at least two mobile networks at the location.

8. The performance measurement method according to claim 7, wherein the step of determining the frequency spectrum information comprises:

selecting at least one of a plurality of licensed frequency bands in a region as the plurality of frequency spectrums.

9. The performance measurement method according to claim 8, wherein the step of selecting the at least one of the plurality of licensed frequency bands comprising:

selecting all of the plurality of licensed frequency bands as the plurality of frequency spectrums.

* * * * *